United States Patent
Yin et al.

(10) Patent No.: US 9,852,352 B2
(45) Date of Patent: *Dec. 26, 2017

(54) SYSTEM AND METHOD FOR DETERMINING COLORS OF FOREGROUND, AND COMPUTER READABLE RECORDING MEDIUM THEREFOR

(71) Applicant: Hanwha Techwin Co., Ltd., Changwon-si (KR)

(72) Inventors: Shimin Yin, Changwon-si (KR); Jikhan Jung, Changwon-si (KR); Jayeong Ku, Changwon-si (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,722

(22) Filed: Feb. 23, 2016

(65) Prior Publication Data

US 2017/0083781 A1 Mar. 23, 2017

(30) Foreign Application Priority Data

Sep. 21, 2015 (KR) ........................ 10-2015-0133093

(51) Int. Cl.
| | |
|---|---|
| *G06T 7/00* | (2017.01) |
| *G06K 9/46* | (2006.01) |
| *G06K 9/38* | (2006.01) |
| *G06T 7/90* | (2017.01) |

(52) U.S. Cl.
CPC ................. *G06K 9/38* (2013.01); *G06T 7/90* (2017.01); *G06T 2207/10016* (2013.01); *G06T 2207/10024* (2013.01); *G06T 2207/30196* (2013.01); *G06T 2207/30232* (2013.01)

(58) Field of Classification Search
CPC ........ G06K 9/38; G06K 9/00771; G06T 7/90; G06T 7/215; G06T 7/11
See application file for complete search history.

(56) References Cited

U.S. PATENT DOCUMENTS

| | | | |
|---|---|---|---|
| 5,432,545 A | 7/1995 | Connolly | |
| 2012/0051594 A1 | 3/2012 | Kim et al. | |
| 2016/0328856 A1* | 11/2016 | Mannino | ................... G06T 7/73 |

FOREIGN PATENT DOCUMENTS

| | | |
|---|---|---|
| JP | 2009-164949 A | 7/2009 |
| KR | 10-2005-0030254 A | 3/2005 |
| KR | 10-2012-0019008 A | 3/2012 |

* cited by examiner

*Primary Examiner* — Brian P Werner
(74) *Attorney, Agent, or Firm* — Sughrue Mion, PLLC (57) ABSTRACT

Provided are a system and method for determining a color of a foreground and a computer readable recording medium therefor. The system includes: at least one processor configured to implement a motion detector which detects a motion region from an image; and a color determiner which determines the color of the foreground in the motion region based on a difference between colors of the motion region and colors of a surrounding region of the motion region, for displaying the determined foreground color with the foreground at a display device.

16 Claims, 10 Drawing Sheets

SYSTEM AND METHOD FOR DETERMINING COLORS OF FOREGROUND, AND COMPUTER READABLE RECORDING MEDIUM THEREFOR

CROSS-REFERENCE TO THE RELATED APPLICATION

This application claims priority from Korean Patent Application No. 10-2015-0133093, filed on Sep. 21, 2015, in the Korean Intellectual Property Office, the disclosure of which is incorporated herein in its entirety by reference.

BACKGROUND

1. Field

Apparatuses and methods consistent with exemplary embodiments relate to determining colors of a foreground of an image, and more particularly, to determining foreground colors even from an inaccurately detected foreground in the image.

2. Description of the Related Art

Color determining and sorting techniques are used for determining colors of objects from images and sorting the determined colors. These techniques are widely used in applications such as image analysis and video surveillance including video search, object search, and object tracking.

In the related art, color determination is carried out by calculating a foreground mask of a moving object using a motion detection technique, and determining a dominant color of a region of the foreground mask as a representative color of the object.

The color determination in the related art is significantly affected by the accuracy of foreground mask calculation. However, a calculated foreground mask does not often match a moving object because of algorithmic limitations.

In most algorithms, a foreground mask is set to be calculated to be greater than the actual region of an object, and thus the foreground mask may include background pixels.

Figure 1A:
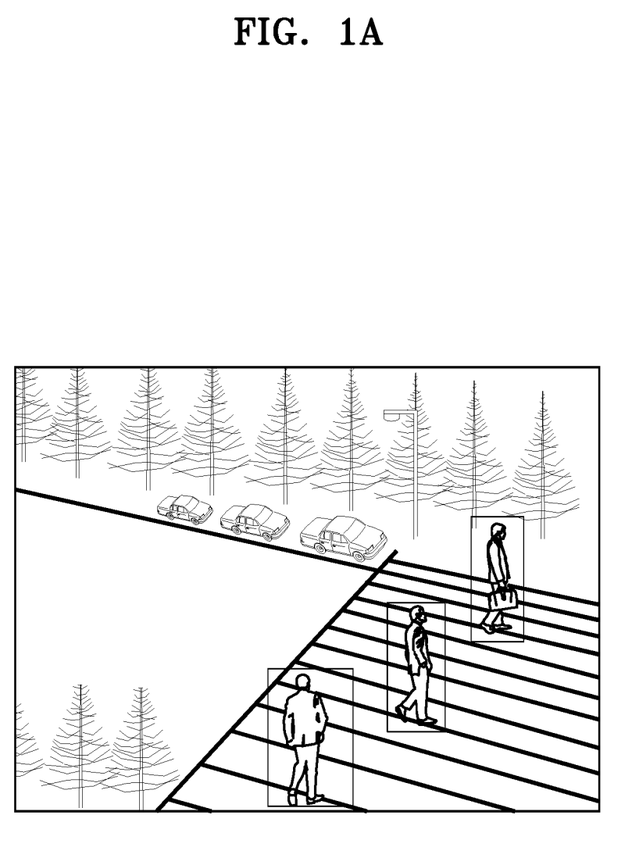
FIGS. 1A and 1B are exemplary views illustrating results of foreground detection performed according to the related art.
Figure 1B:
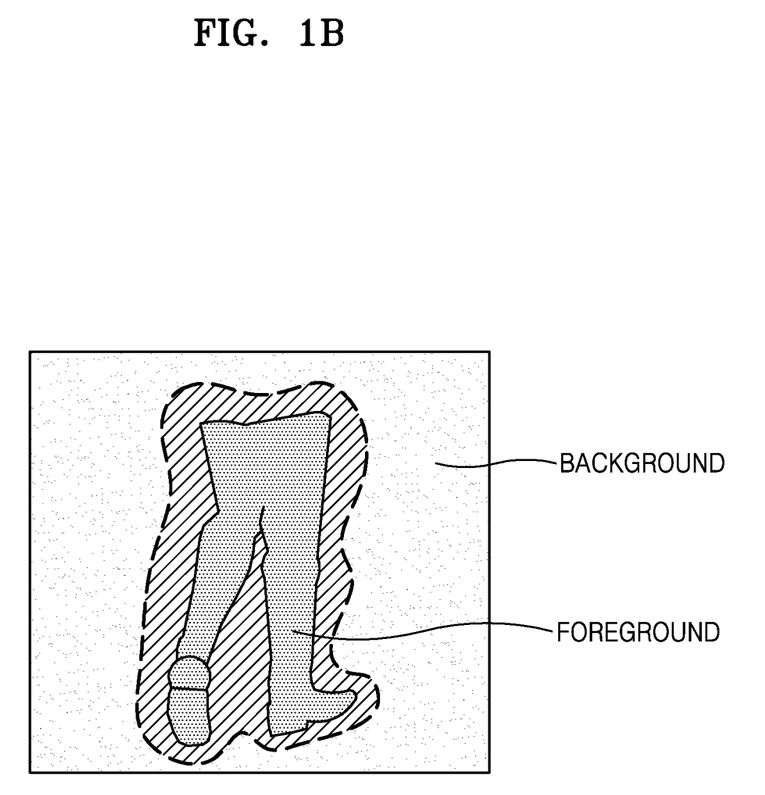

FIGS. 1A and 1B are exemplary views illustrating results of foreground detection performed according to the related art. Referring to FIG. 1B, a region denoted by a dashed line is a foreground mask region calculated using an algorithm of the related art, and gray, which is the color of stairs that people step on in FIG. 1A, is calculated as the dominant color, that is, the representative color of the foreground mask region.

For example, although a color that a person intends to perceive in ground truth data is the color of a military uniform (for example, green), a totally different color may be detected, and thus, incorrect results may be obtained in a later video search process.

SUMMARY

One or more exemplary embodiments provide a system and method for accurately determining foreground colors even from an inaccurately detected foreground, and a computer readable recording medium therefor.

Various aspects will be set forth in part in the description which follows and, in part, will be apparent from the description, or may be learned by practice of the presented embodiments.

According to one or more exemplary embodiments, there is provided a system for determining at least one color of a foreground which may include: a motion detector configured to detect a motion region from an image; and a color determiner configured to determine the color of the foreground included in the motion region based on a difference between at least one color of the motion region and at least one color of a surrounding region of the motion region, for displaying the foreground color with the foreground at a display device.

The color determiner may be further configured to generate a color histogram of the surrounding region and a color histogram of the motion region, obtain a color histogram of the foreground based on a difference between the color histogram of the motion region and the color histogram of the surrounding region, and determine the color of the foreground from the color histogram of the foreground.

The motion region may include a first section corresponding to the foreground and a second section corresponding to a remaining section of the motion region, and the color determiner may be further configured to determine at least one color of the first section as the foreground color.

The system may further include a display device configured to display the foreground color determined by the color determiner on a border of the foreground.

In an image frame including the motion region, the surrounding region may be a region not including the motion region.

According to one or more exemplary embodiments, there is provided a method of determining at least one color of a foreground. The method may include: detecting a motion region from an image; and determining the color of the foreground included in the motion region based on a difference between at least one color of the motion region and at least one color of a surrounding region of the motion region, for displaying the foreground color with the foreground at a display device.

The determining the color of the foreground may include: generating a color histogram of the surrounding region and a color histogram of the motion region; obtaining a color histogram of the foreground based on a difference between the color histogram of the motion region and the color histogram of the surrounding region; and determining the color of the foreground from the color histogram of the foreground.

The motion region may include a first section corresponding to the foreground and a second section corresponding to a remaining section of the motion region, and the determining the foreground color may include determining at least one color of the first section as the foreground color.

The method may further include displaying the color of the foreground determined by the determining the color of the foreground on a border of the foreground.

In an image frame including the motion region, the surrounding region may be a region not including the motion region.

According to one or more exemplary embodiments, a computer readable recording medium stores a program for executing the method of determining the foreground color.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Reference will now be made in detail to exemplary embodiments which are illustrated in the accompanying drawings, wherein like reference numerals refer to like elements throughout. In this regard, the presented embodiments may have different forms and should not be construed as being limited to the descriptions set forth herein. Accordingly, the exemplary embodiments are merely described below, by referring to the figures, to explain aspects of the inventive concept.

In the following description, the technical terms are used only for explaining the exemplary embodiments while not limiting the inventive concept. The terms of a singular form may include plural forms unless referred to the contrary. The meaning of "include" or "comprise" specifies a property, a fixed number, a step, a process, an element, a component, and a combination thereof but does not exclude other properties, fixed numbers, steps, processes, elements, components, and combinations thereof. It will be understood that although the terms "first" and "second" are used herein to describe various elements, these elements should not be limited by these terms. Terms are only used to distinguish one element from other elements.

Figure 2:
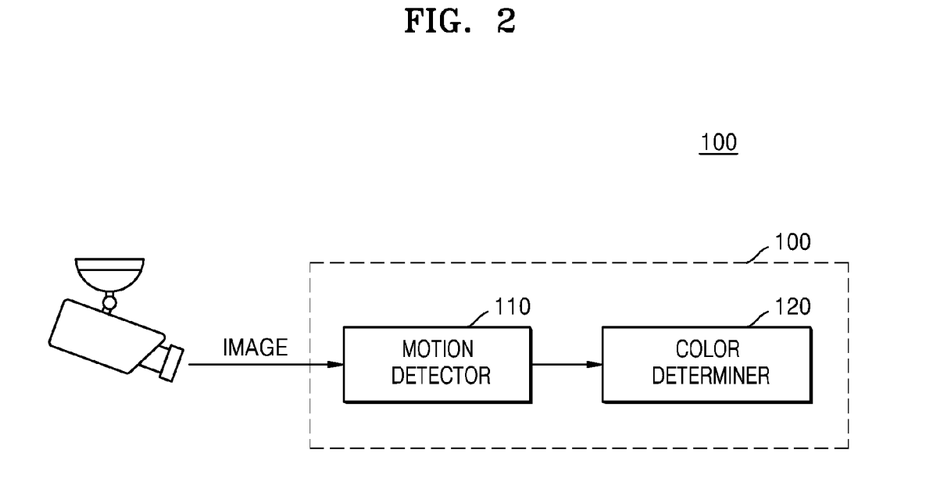
FIG. 2 is a schematic view illustrating a system for determining colors of a foreground according to an exemplary embodiment.

FIG. 2 is a schematic view illustrating a system 100 for determining colors of a foreground according to an exemplary embodiment.

Referring to FIG. 2, the foreground color determining system 100 of the exemplary embodiment may include a motion detector 110 and a color determiner 120.

The motion detector 110 may detect a motion region from an image. The image may be any image obtained or captured using any imaging device capable of capturing images. The image may include a background and a foreground. The motion region may correspond to the foreground of the image and may be detected using a motion detection technique.

In a scene including two regions sharing a boundary, a region that is a subject of perception is referred to as a foreground, and the other region is referred to as a background. Generally, a foreground appears as a front portion, and a background appears as a backward portion. Thus, the terms "foreground" and "background" are used with such meanings. However, this is not always the case. A boundary between a foreground and a background appears to be included in the foreground, and the foreground appears to be well defined compared to the background. In addition, the foreground looks brighter than the background.

In the image shown in FIG. 1B, a person corresponds to a foreground, and the remaining region of the image (or frame) not including the foreground corresponds to a background.

The foreground color determining system 100 of the exemplary embodiment is provided to accurately determine colors of the foreground, and thus if a region corresponding to the foreground is not accurately detected, it may be difficult to accurately determine the colors of the foreground. Here, the colors determined by the foreground color determining system 100 may be one color when the foreground has only one color or a dominant color when the foreground has a plurality of colors.

A motion detection technique may be defined as a process of detecting the position of an object varying relative to the surrounding environment or a method of detecting variations of the surrounding environment relative to a target object. According to the motion detection technique, motions may be detected by a mechanical or electronic method.

An example of a mechanical motion detection technique is a technique related to keyboards. Keys of a keyboard have different positions. If a key is pressed to a certain degree, the key may be turned on, and a letter or digit corresponding to the position of the key may be input.

Examples of an electronic motion detection technique include an optical detection technique and an acoustic detection technique. In the optical detection technique, the motion of an object may be detected using infrared rays or laser beams.

A simple algorithm for detecting motions using an imaging device (such as a camera) is to compare a current image with a reference image and count the number of pixels having different data values. Pixels of the current image having data values different from pixel data values of the reference image may be considered as moving pixels, and a region formed by the moving pixels may be determined as a motion region.

In addition to the above-mentioned techniques, many other techniques may be used to detect motions. However, the accuracy of motion detection using such techniques is often low.

A region corresponding to a foreground has to be accurately detected from an image before determining colors of the foreground, and the accuracy of color determination is significantly affected by the accuracy of a motion detection technique.

Due to this reason, the foreground color determining system 100 of the exemplary embodiment uses the difference between colors of a motion region detected using a motion detection technique and colors of a surrounding region of the motion region.

In FIG. 1B, the region denoted (i.e., enclosed) by a dashed line corresponds to a motion region, and the remaining region not including the motion region corresponds to a surrounding region. That is, the motion region is detected from the image including a foreground, and the detected motion region includes a section actually corresponding to the foreground. In the image including the foreground, the remaining region not including the motion region corresponds to the surrounding region, and the foreground color determining system 100 of the exemplary embodiment is provided to determine actual colors of the foreground.

The color determiner 120 determines foreground colors from the motion region based on the difference between colors of the motion region and colors of the surrounding region. Here, the term "colors" indicated in a plural form may represent a single color, depending on an image which is input to the foreground color determining system 100. If a technique used to detect the motion region has low accuracy, the motion region may include a section actually corresponding to the foreground and a section corresponding to the background. In this case, the section of the motion region corresponding to the background, that is, the remaining area of the motion region except the section actually corresponding to the foreground, may have colors similar to colors of the background rather than to colors of the foreground.

Thus, the color determiner 120 may determined the colors of the foreground by removing the colors corresponding to the background from the colors of the motion region. In this manner, although the motion region is inaccurately detected, the foreground color determining system 100 may accurately determine the colors of the foreground.

Information about the colors of the background is needed to remove the colors corresponding to the background from the colors of the motion region. However, the foreground color determining system 100 of the exemplary embodiment is capable of determining the colors of the foreground even when information about the colors of the background is unknown.

To this end, the color determiner 120 may remove colors corresponding to the surrounding region from the colors corresponding to the motion region. In the motion region, the section not included in the foreground may not have the same colors as the colors of the surrounding region. However, the colors of the surrounding region may be similar to the colors of the section of the motion region not included in the foreground rather than to the colors of the foreground. Here, the color determiner 120 may determine that the colors of the section of the motion region not included in the foreground is substantially similar to or the same as the colors of the surrounding region. Thus, the color determiner 120 does not have to or may not be configured to determine any color from the section of the motion region not included in the foreground to determine the colors of the surrounding region and the colors of the foreground, thereby reducing the load of the foreground color determining system 100.

That is, when information about colors of the background is unknown, the colors of the surrounding region expected to be similar to the colors of the background may be used to remove the colors corresponding to the colors of the background from the colors of the motion region.

Figure 3:
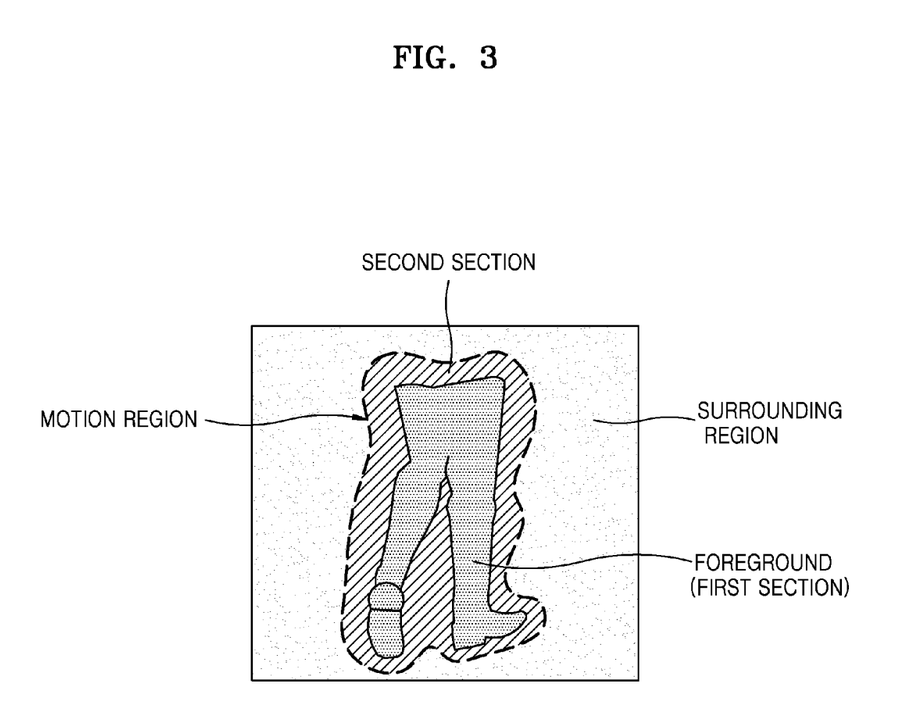
FIG. 3 is a schematic view illustrating a relationship among a foreground, a surrounding region, and a motion region included in a frame.

FIG. 3 is a schematic view illustrating a relationship among a foreground, a surrounding region, and a motion region that are included in a frame.

According to an exemplary embodiment, colors to be determined using the foreground color determining system 100 are colors of the foreground, and in FIG. 3, the foreground corresponds to the lower body of a person.

An operation of separating a region corresponding to the foreground from the frame (image) may first be performed before determining colors of the foreground, and the separated region may correspond to the motion region denoted by a dashed line in FIG. 3. The motion region may be detected consistent with the foreground. However, if the motion region is detected inconsistent with the foreground, the colors of the foreground may not be accurately determined.

Due to this, the foreground color determining system 100 of the exemplary embodiment determines colors of the motion region including a section corresponding to a background and remove colors of the section corresponding to the background from the colors of the motion region.

For example, the motion region may include a first section corresponding to the foreground and a second section as the remaining region. That is, the first section corresponds to the foreground, and the second section corresponds to the background. It is desired that the motion region detected using the motion detector 110 illustrated in FIG. 2 is accurately consistent with the foreground. That is, it is desired that the first section is accurately detected. However, due to errors of a motion detection operation, the motion region may include the second section as well as the first section actually corresponding to the foreground. The second section corresponds to the background and, the size of the second section may increase as the accuracy of motion detection decreases.

Thus, it is necessary to remove colors of the second section corresponding to the background from the colors of the motion region so as to determine colors of the first section actually corresponding to the foreground. This may be described by following formula 1.

$$C\_TF = C\_MD - C\_FF \qquad (1),$$

where $C\_TF$ refers to the colors of the first section, $C\_MD$ refers to colors of the motion region, and $C\_FF$ refers to colors of the second section.

In addition, since the second section corresponds to the background, the colors of the second section may be described by following formula 2.

$$C\_FF = C\_BM \qquad (2),$$

where $C\_BM$ refers to the colors of the background.

Substitution of formula 2 into formula 1 gives:

$$C\_TF = C\_MD - C\_BM \qquad (3)$$

Since the colors of the background corresponding to the second section are not obtainable from the image, information to be used instead of colors of the background is necessary. To this end, the foreground color determining system 100 of the current exemplary embodiment uses information about colors of the surrounding region. Therefore, formula 3 may be expressed as follows.

$$C\_TF = C\_MD - C\_SR \qquad (4),$$

where $C\_SR$ refers to colors of the surrounding region.

Actually, $C\_BM = C\_SR$ is not correct. However, in general 2D images, colors of background pixels close to a foreground are often similar to colors of background pixels that are somewhat distant from the foreground. That is, in 2D images, colors or color distribution of background pixels around a foreground are likely to be similar regardless of the distance from the foreground. Therefore, it may be possible to assume that $C\_BM \approx C\_SR$.

In the exemplary embodiment, the color determiner 120 may determine colors of the motion region and colors of the surrounding region, and may then remove the colors of the surrounding region from the colors of the motion region, so as to obtain colors of the foreground.

Figure 4A:
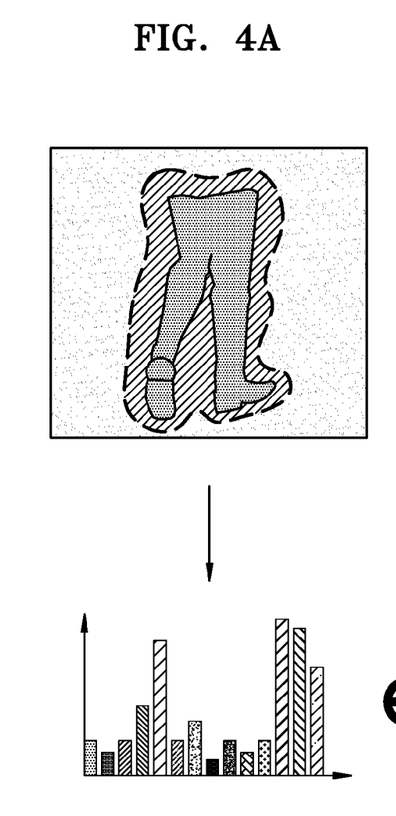
FIGS. 4A to 4C are exemplary views illustrating foreground color determining operations according to exemplary embodiments.
Figure 4B:
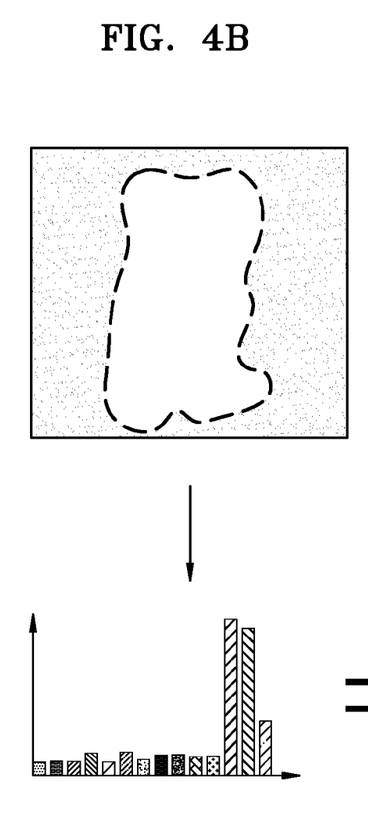
Figure 4C:
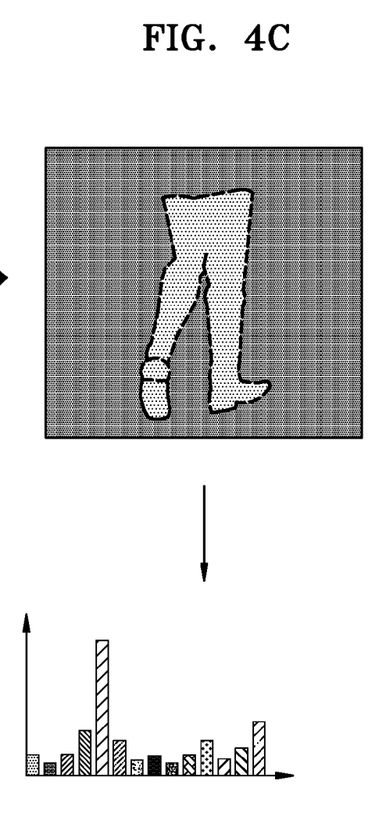

FIGS. 4A to 4C are exemplary views illustrating foreground color detecting operations according to an exemplary embodiment.

The foreground color detecting operations illustrated in FIGS. 4A to 4C may be performed by the color determiner 120 described with reference to FIGS. 2 and 3. Referring to FIGS. 4A to 4C, the color determiner 120 generates a color histogram of a motion region and a color histogram of a surrounding region.

The color histograms express distribution of pixel values or brightness values of pixels in an image. In each of the color histograms shown in FIGS. 4A to 4C, the horizontal axis refers to gray level colors, and the vertical axis refers to the frequency of each color.

For example, in the horizontal axis of each of the color histograms shown in FIGS. 4A to 4C, the rightmost color is black, and the coordinates of black in an n-bit RGB color coordinate system are (0, 0, 0). The third color from the right in the horizontal axis of each color histogram is white, and the coordinates of white in the n-bit RGB color coordinate system are ($2^n-1$, $2^n-1$, $2^n-1$).

In general color histograms, colors are not always expressed as described above. In another example, the horizontal axis of each of the color histograms may have RGB color coordinates (0, 0, 0) to ($2^n-1$, $2^n-1$, $2^n-1$) from the origin to the final color.

FIG. 4A illustrates the color histogram of the motion region, and FIG. 4B illustrates the color histogram of the surrounding region. FIG. 4C illustrates a color histogram of a foreground.

As shown in FIGS. 4A to 4C, the color histogram of the foreground may be obtained based on the difference between the color histogram of the motion region and the color histogram of the surrounding region.

The color histogram of the motion region shown in FIG. 4A is compared with the color histogram of the surrounding region shown in FIG. 4B so as to calculate the difference in each color frequency between the color histograms and thus to obtain the color histogram of the foreground.

In the color histogram of the foreground obtained as described above, a color having the highest frequency may be determined as the representative color of the foreground. In FIG. 4C, a color having the highest frequency is green. Thus, green may be determined as the representative color of the foreground and may be determined as the color of the foreground.

Figure 5:
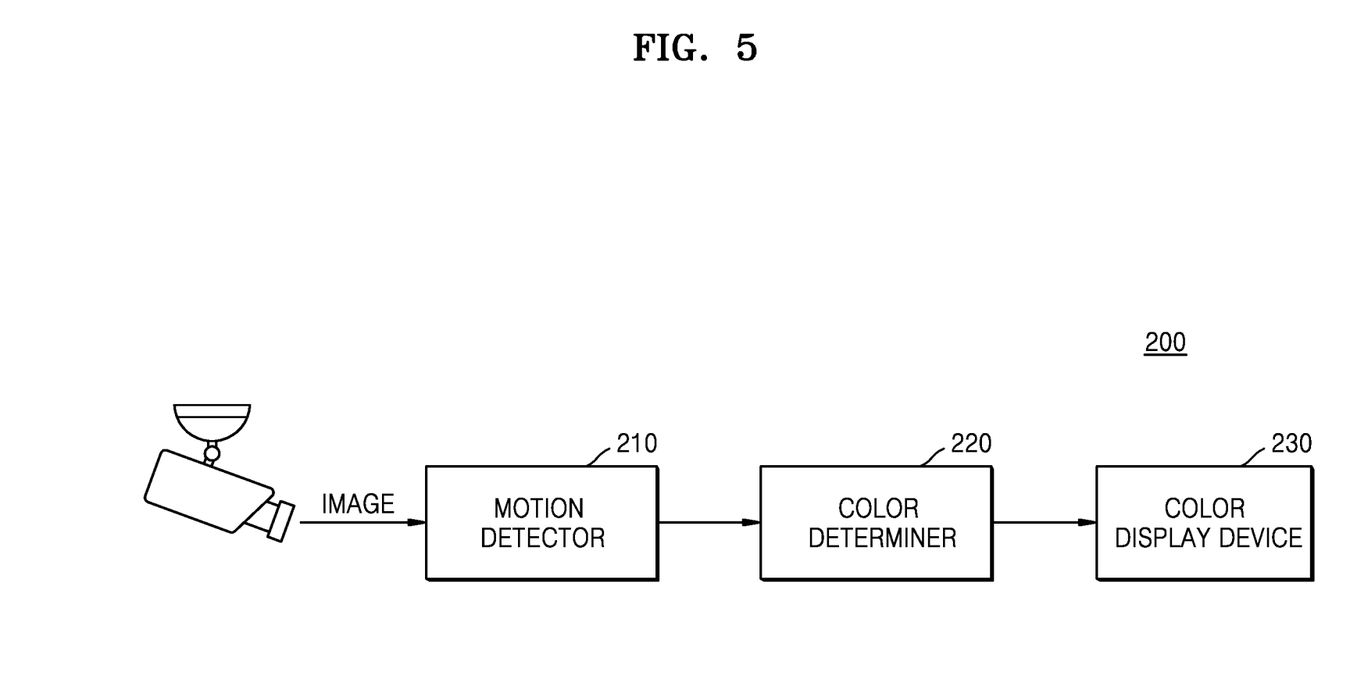
FIG. 5 is a schematic view illustrating a system for determining colors of a foreground according to another exemplary embodiment.

FIG. 5 is a schematic view illustrating a foreground color determining system 200 according to another exemplary embodiment.

Referring to FIG. 5, the foreground color determining system 200 of the exemplary embodiment includes a motion detector 210, a color determiner 220, and a color display device 230. The motion detector 210 and the color determiner 220 are substantially the same as the motion detector 110 and the color determiner 120 described with reference to FIG. 2, and thus repeated descriptions thereof will be omitted.

The color display device 230 displays colors determined by the color determiner 220 on a border of a foreground. In the example shown in FIG. 4, if green is detected as the representative color of the foreground, the color display device 230 may display green on the border of the foreground. That is, if an image captured using an imaging device is provided to the color display device 230, the color display device 230 may display the representative color of the foreground of the image on the border of the foreground.

In addition, the color display device 230 may receive an image signal and may display colors of the foreground of an image corresponding to the image signal via a display device capable of displaying the image. In this case, the colors of the foreground may be displayed on the display device, or letters corresponding to the colors of the foreground may be displayed on the display device.

Figure 6:
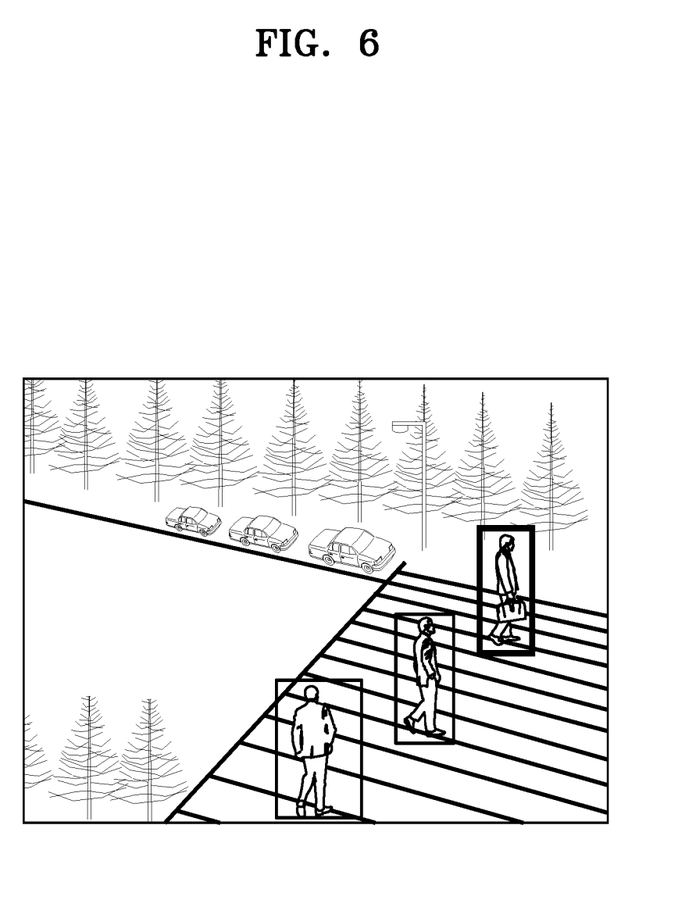
FIG. 6 is an exemplary view illustrating how foreground colors are displayed according to an exemplary embodiment.

FIG. 6 is an exemplary view illustrating how foreground colors are displayed according to an exemplary embodiment.

As described with reference to FIG. 5, in the foreground color determining system 200 of the exemplary embodiment, the foreground colors determined using the color determiner 220 are displayed using the color display device 230.

Referring to FIG. 6, the color display device 230 may display colors of the foreground on a border of a rectangular region including the foreground. For example, if green is detected as the representative color of the foreground, the color display device 230 may display the border of the rectangular region with green. Similarly, if blue is detected as the representative color of the foreground, the color display device 230 may display the border of the rectangular region with blue.

However, the screen illustrated in FIG. 6 is an example for describing a method of displaying colors of a foreground. That is, the inventive concept is not limited to the method of displaying a color of a foreground on a border of a rectangular region.

The color display device 230 may display letters corresponding to a color determined from a foreground in a peripheral region of the foreground. For example, a color of a foreground may be displayed on a border of a rectangular region including the foreground as shown in FIG. 6. In another example, however, after a motion region is detected using the motion detector 110 or 210 of the exemplary embodiment, a color of a foreground of the motion region may be displayed on a border of the motion region. In addition, as described with reference to FIG. 5, letters corresponding to a color determined from a foreground may be displayed at a position around the foreground.

Figure 7:
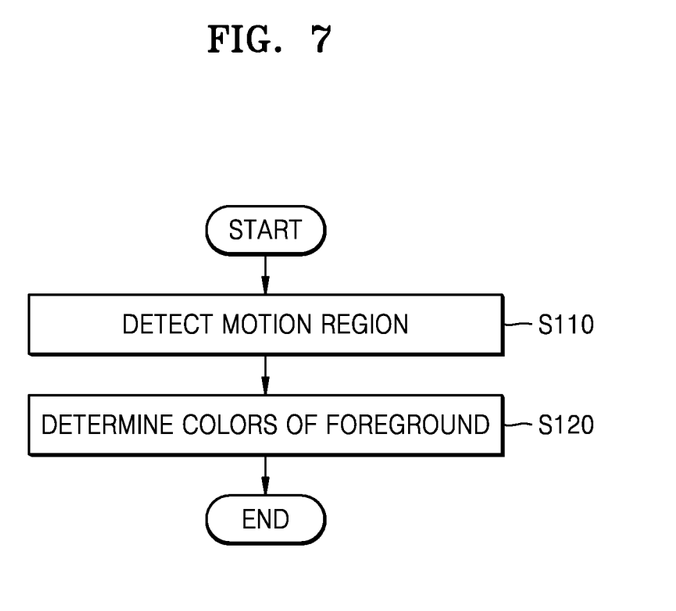
FIG. 7 is a flowchart illustrating a method of determining colors of a foreground according to an exemplary embodiment.

FIG. 7 is a flowchart illustrating a method of determining colors of a foreground according to an exemplary embodiment.

Referring to FIG. 7, the foreground color determining method of the exemplary embodiment includes an operation S110 of detecting a motion region and an operation S120 of determining colors of a foreground. In the motion region detecting operation S110, the motion region may be detected from an image using a foreground color determining device.

The foreground color determination method may be performed using the foreground color determining device, and the foreground color determining device may include substantially the same elements as the elements of the foreground color determining system 100 or 200 described with reference to FIGS. 2 to 6.

The motion region detected in the motion region detecting operation S110 may be a region corresponding to the foreground of the image that the foreground color determining device has captured or received, and the image may be captured using any imaging device capable of capturing images that may include backgrounds and foregrounds.

Therefore, the motion region may be a region corresponding to the foreground of the image. The motion region may be detected by a motion detection technique.

In the foreground color determining operation S120, colors of the foreground of the motion region are determined based on the difference between colors of the motion region and colors of a surrounding region of the motion region. A region corresponding to the foreground has to be accurately detected from the image before determining colors of the foreground, and the accuracy of color determination is significantly affected by the accuracy of a motion detection technique.

Due to this reason, the foreground color determining method of the exemplary embodiment uses the difference between colors of the motion region detected using the motion detection technique and colors of the surrounding region.

If the accuracy of the motion detection technique is low, the motion region may include a section other than a section actually corresponding to the foreground. If the section of the motion region actually corresponding to the foreground is referred to as a first section, and the section of the motion region other than the first section is referred to as a second section, the second section may substantially correspond to the background.

In the foreground color determining operation S120, the colors of the foreground of the motion region are determined based on the difference between the colors of the motion region and the colors of the surrounding region. If a technique used to detect the motion region has low accuracy, the motion region may include a section actually corresponding to the foreground and a section actually corresponding to the background. In this case, the section of the motion region corresponding to the background, that is, the remaining area of the motion region except the region actually corresponding to the foreground, may have colors similar to colors of the background rather than colors of the foreground.

Thus, in the foreground color determining operation S120, colors of the foreground may be determined by removing colors corresponding to colors of the background from colors of the motion region. In this manner, although the motion region is inaccurately detected, colors of the foreground may be accurately determined by the foreground color determining method of the exemplary embodiment.

Information about colors of the background may be necessary to remove colors corresponding to the background from colors of the motion region. However, according to the foreground color determining method of the exemplary embodiment, colors of the foreground may be determined even when information about colors of the background is unknown.

To this end, in the foreground color determining operation S120, colors corresponding to the surrounding region may be removed from colors corresponding to the motion region. In the motion region, the second section not included in the foreground may not have the same colors as the colors of the surrounding region. However, the colors of the surrounding region may be similar to the colors of the second section rather than to the colors of the foreground.

That is, when information about colors of the background is unknown, the colors of the surrounding region expected to be similar to the colors of the background may be used to remove colors corresponding to the colors of the background from the colors of the motion region.

Figure 8:
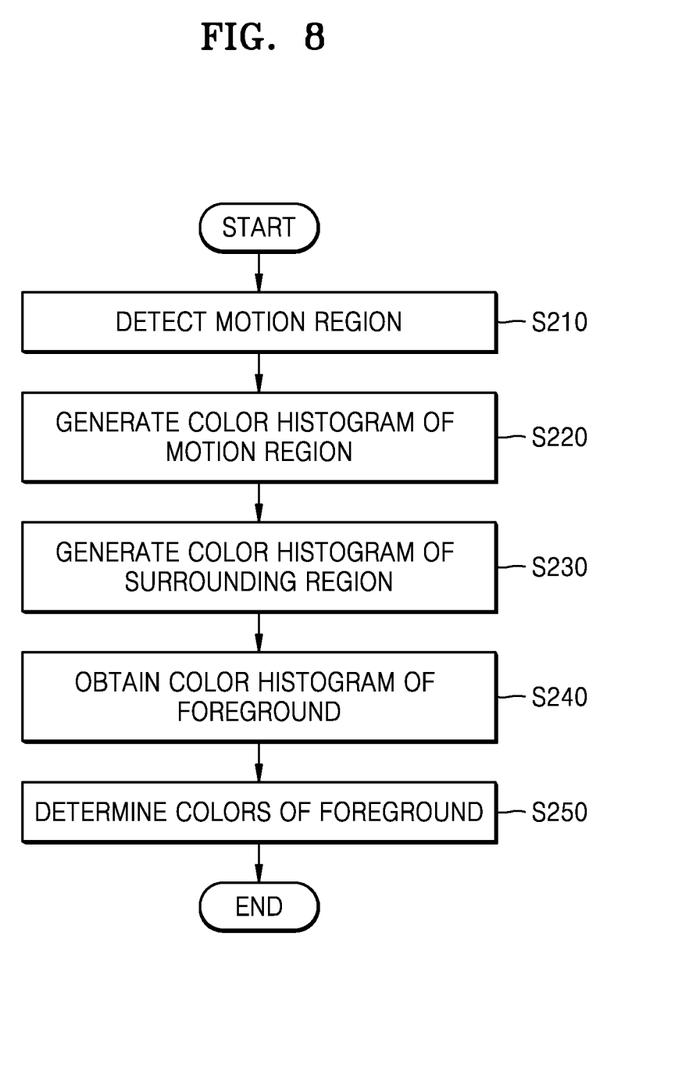
FIG. 8 is a flowchart illustrating a method of determining colors of a foreground according to another exemplary embodiment.

FIG. 8 is a flowchart illustrating a method of determining colors of a foreground according to another exemplary embodiment.

Referring to FIG. 8, the foreground color determining method of the exemplary embodiment includes an operation S210 of detecting a motion region, an operation S220 of generating a color histogram of the motion region, an operation S230 of generating a color histogram of a surrounding region, an operation S240 of obtaining a color histogram of a foreground, and an operation S250 of determining colors from the foreground.

In the motion region detecting operation S210, the motion region may be detected from an image using a foreground color determining device. The motion region detected in the motion region detecting operation S210 may be a region corresponding to a foreground of the image that the foreground color determining device has captured or received, and the image may be captured using any imaging device capable of capturing images that may include backgrounds and foregrounds. Therefore, the motion region may be a region corresponding to the foreground of the image, and the motion region may be detected by a motion detection technique.

In the operation 240, the color histogram of the foreground may be obtained based on the difference between the color histogram of the motion region generated in the operation S220 and the color histogram of the surrounding region generated in the operation S230.

As described with reference to FIG. 7, as the accuracy of the motion detection technique decreases, the motion region may include more of a region corresponding to the background. In this case, if colors corresponding to the background are removed from colors of the motion region so as to determine colors of a region actually corresponding to the foreground, the accuracy of foreground color determination may be increased.

In the foreground color determining method of the exemplary embodiment, color histograms are used for foreground color determination, and in the foreground color determining operation S250, one of colors of the foreground having the highest frequency may be determined as a representative color of the foreground.

Figure 9:
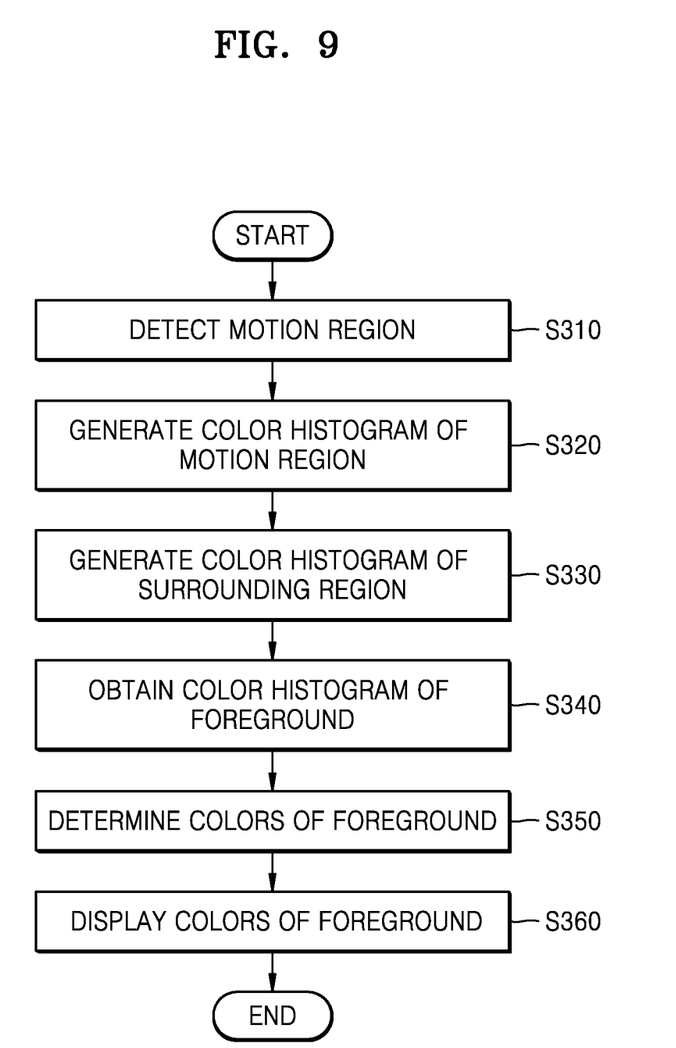
FIG. 9 is a flowchart illustrating a method of determining colors of a foreground according to another exemplary embodiment.

FIG. 9 is a flowchart illustrating a method of determining colors of a foreground according to another exemplary embodiment.

Referring to FIG. 9, the foreground color determining method of the exemplary embodiment includes an operation S310 of detecting a motion region, an operation S320 of generating a color histogram of the motion region, an operation S330 of generating a color histogram of a surrounding region, an operation S340 of obtaining a color histogram of a foreground, an operation 350 of determining colors of the foreground, and an operation S360 of displaying the colors of the foreground.

The operation S310 of detecting the motion region, the operation S320 of generating the color histogram of the motion region, the operation S330 of generating the color histogram of the surrounding region, the operation S340 of obtaining the color histogram of the foreground, and the operation 350 of determining the colors of the foreground are the same as the operation S210 of detecting the motion region, the operation S220 of generating the color histogram of the motion region, the operation S230 of generating the color histogram of the surrounding region, the operation S240 of obtaining the color histogram of the foreground, and the operation S250 of determining the colors of the foreground that are described with reference to FIG. 8.

In the foreground color displaying operation S360, the colors determined in the foreground color determining operation S350 may be displayed on a border of the foreground. In the example shown in FIG. 4, if green is detected as a representative color of the foreground, green may be displayed on the border of the foreground in the foreground color displaying operation S360. That is, in the foreground color displaying operation S360, the representative color of the foreground of an image captured using an imaging device may be displayed on the border of the foreground.

Alternatively, in the foreground color displaying operation S360, an image signal may be received, and the colors of the foreground of an image corresponding to the image signal may be displayed using a display device capable of displaying the image. In this case, the colors of the foreground may be displayed on the display device, or letters corresponding to the colors of the foreground may be displayed on the display device.

The inventive concept may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage. The computer readable recording medium can also be distributed over network coupled computer systems so that the computer readable code is stored and executed in a distributed fashion. Also, functional programs, codes, and code segments for accomplishing the inventive concept can be easily construed by programmers skilled in the art to which the inventive concept pertains.

Operations constituting a method of an exemplary embodiment may be performed in appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the exemplary embodiments unless defined by the claims. Also, those skilled in the art will readily appreciate that many alternations, combinations, and modifications may be made according to design conditions and factors within the scope of the appended claims and their equivalents.

At least one of the components, elements, modules or units represented by a block as illustrated in FIGS. 2 and 5 may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

As described above, according to the one or more of the above exemplary embodiments, foreground colors may be accurately determined even from an inaccurately detected foreground using the system, method, and the computer readable recording medium.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. A system for determining at least one color of a foreground, the system comprising:
   at least one processor configured to implement:
      a motion detector configured to detect a motion region from an image; and
      a color determiner configured to
      i) determine the color of the foreground included in the motion region based on a difference between at least one color of the motion region and at least one color of a surrounding region of the motion region
      ii) generate a color histogram of the surrounding region and a color histogram of the motion region,
      iii) obtain a color histogram of the foreground based on a difference between the color histogram of the motion region and the color histogram of the surrounding region, and
      iv) determine the color of the foreground from the color histogram of the foreground, for displaying the determined color with the foreground at a display device,
   wherein the color of the foreground is a representative color which has the highest frequency in two or more colors of the foreground shown in the color histogram of the foreground.

2. The system of claim 1, wherein the motion region comprises a first section corresponding to the foreground and a second section corresponding to a remaining section of the motion region.

3. The system of claim 2, wherein the color determiner is configured to determine at least one color of the first section as the color of the foreground, and
   wherein the color determiner is not configured to determine any color from the second section to determine the color of the surrounding region or the color of the foreground.

4. The system of claim 2, wherein the color determiner is configured to determine that the color of the second section is substantially similar to or the same as the color of the surrounding region, and remove the color of the second section from the color of the motion region to determine the color of the foreground.

5. The system of claim 1, further comprising a display device configured to display the color of the foreground determined by the color determiner on a border of the foreground.

6. The system of claim 1, wherein in an image frame comprising the motion region, the surrounding region is a region not including the motion region.

7. The system of claim 1, wherein the color determiner is configured to determine the color of the motion region and the color of the surrounding region, and remove the color of the surrounding region from the color of the motion region to determine the color of the foreground.

8. The system of claim 1, wherein the color of the foreground determined by the color determiner is a dominant color among a plurality of colors of the foreground.

9. A method of determining at least one color of a foreground, the method comprising:
  detecting a motion region from an image; and
  determining the color of the foreground included in the motion region based on a difference between at least one color of the motion region and at least one color of a surrounding region of the motion region, for displaying the determined color with the foreground at a display device,
  wherein the determining the color of the foreground comprises:
    generating a color histogram of the surrounding region and a color histogram of the motion region;
    obtaining a color histogram of the foreground based on a difference between the color histogram of the motion region and the color histogram of the surrounding region; and
    determining the color of the foreground from the color histogram of the foreground,
  wherein the color of the foreground is a representative color which has the highest frequency in two or more colors of the foreground shown in the color histogram of the foreground.

10. The method of claim 9, wherein the motion region comprises a first section corresponding to the foreground and a second section corresponding to a remaining section of the motion region.

11. The method of claim 10, wherein the determining the color of the foreground comprises determining at least one color of the first section as the color of the foreground, and
  wherein the determining the color of the foreground does not comprise determining any color from the second section to determine the color of the surrounding region of the color of the foreground.

12. The method of claim 10, wherein the determining the color of the foreground comprises:
  determining that the color of the second section is substantially similar to or the same as the color of the surrounding region; and
  removing the color of the second section from the color of the motion region to determine the color of the foreground.

13. The method of claim 9, further comprising displaying the color of the foreground determined by the determining the color of the foreground on a border of the foreground.

14. The method of claim 9, wherein in an image frame comprising the motion region, the surrounding region is a region not including the motion region.

15. The method of claim 9, wherein the determining the color of the foreground comprises:
  determining the color of the motion region and the color of the surrounding region; and
  removing the color of the surrounding region from the color of the motion region to determine the color of the foreground.

16. A non-transitory computer readable recording medium storing a program for executing the method of claim 9.

* * * * *